United States Patent
Wu

(10) Patent No.: US 12,181,594 B2
(45) Date of Patent: Dec. 31, 2024

(54) POSITIONING TARGET DEVICE

(71) Applicant: Nokia Technologies Oy, Espoo (FI)

(72) Inventor: Dawei Wu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 316 days.

(21) Appl. No.: 17/786,970

(22) PCT Filed: Jan. 2, 2020

(86) PCT No.: PCT/CN2020/070157
§ 371 (c)(1),
(2) Date: Jun. 17, 2022

(87) PCT Pub. No.: WO2021/134767
PCT Pub. Date: Jul. 8, 2021

(65) Prior Publication Data
US 2023/0094226 A1 Mar. 30, 2023

(51) Int. Cl.
*G01S 5/12* (2006.01)
*G01S 5/00* (2006.01)
*H04W 24/10* (2009.01)

(52) U.S. Cl.
CPC .......... *G01S 5/0063* (2013.01); *G01S 5/0054* (2013.01); *H04W 24/10* (2013.01)

(58) Field of Classification Search
CPC ......... G01S 5/12; G01S 5/0063; G01S 5/0054
See application file for complete search history.

(56) References Cited

U.S. PATENT DOCUMENTS

| | | |
|---|---|---|
| 2013/0130712 A1 | 5/2013 | Karasudani |
| 2014/0105054 A1* | 4/2014 | Sægrov ............... H04W 64/00 370/252 |
| 2015/0018017 A1 | 1/2015 | Jang et al. |
| 2015/0309180 A1 | 10/2015 | Jiang et al. |
| 2017/0115376 A1 | 4/2017 | Kim et al. |
| 2018/0270617 A1 | 9/2018 | Zhang et al. |
| 2019/0219665 A1 | 7/2019 | Ye et al. |
| 2021/0258042 A1* | 8/2021 | Oishi ..................... G01S 5/0218 |

(Continued)

FOREIGN PATENT DOCUMENTS

| | | |
|---|---|---|
| CN | 102802259 A | 11/2012 |
| CN | 103249139 A | 8/2013 |
| CN | 103338511 A | 10/2013 |

(Continued)

OTHER PUBLICATIONS

Zheng et al., "Smart Phone and Next Generation Mobile Computing", Morgan Kaufmann, 2006, 429 pages.

(Continued)

*Primary Examiner* — Barry W Taylor
(74) *Attorney, Agent, or Firm* — Nokia Technologies Oy

(57) ABSTRACT

Embodiments of the present disclosure relate to positioning target device. According to embodiments of the present disclosure, the location of the target device is measured by two anchor devices. The distances between the target device at a location and the anchor devices are measured and the distances between the target device at a further location and the anchor devices are also measured. The location of the target device is estimated based on the distances. In this way, fewer anchor devices are used to perform the positioning.

20 Claims, 10 Drawing Sheets

(56) References Cited

U.S. PATENT DOCUMENTS

| | | | | |
|---|---|---|---|---|
| 2022/0039059 | A1* | 2/2022 | Nguyen | ............... G01S 5/017 |
| 2023/0168334 | A1* | 6/2023 | Wang | ............... G01S 5/0242 |
| | | | | 455/456.1 |

FOREIGN PATENT DOCUMENTS

| | | |
|---|---|---|
| CN | 105510876 A | 4/2016 |
| CN | 105866734 A | 8/2016 |
| CN | 108513353 A | 9/2018 |
| CN | 109029427 A | 12/2018 |
| WO | 2015/054866 A1 | 4/2015 |

OTHER PUBLICATIONS

Uddin, "Low-overhead Range-based 3D Localization Technique for Underwater Sensor Networks", IEEE International Conference on Communications (ICC), May 22-27, 2016, pp. 1-6.

Kuruoglu et al., "Three Dimensional Localization in Wireless Sensor Networks using the Adapted Multi-Lateration Technique Considering Range Measurement Errors", IEEE Globecom Workshops, Nov. 30-Dec. 4, 2009, 5 pages.

Cobos et al., "A Survey of Sound Source Localization Methods in Wireless Acoustic Sensor Networks", Hindawi, Wireless Communications and Mobile Computing, vol. 2017, Aug. 17, 2017, pp. 1-24.

International Search Report and Written Opinion received for corresponding Patent Cooperation Treaty Application No. PCT/CN2020/070157, dated Sep. 3, 2020, 10 pages.

"3rd Generation Partnership Project; Technical Specification Group Radio Access Network; LTE Positioning Protocol (LPP) (Release 17)", 3GPP TS 37.355, V17.0.0, Mar. 2022, pp. 1-340.

"3rd Generation Partnership Project; Technical Specification Group Radio Access Network; NG-RAN; NR Positioning Protocol A (NRPPa) (Release 17)", 3GPP TS 38.455, V17.0.0, Apr. 2022, pp. 1-195.

Extended European Search Report received for corresponding European Patent Application No. 20910004.9, dated Aug. 29, 2023, 8 pages.

Office action received for corresponding Chinese Patent Application No. 202080091589.4, dated Aug. 29, 2024, 7 pages of office action and 5 pages of translation available.

Peng et al., "A Highly Accurate Localization System Based on Hybrid IMU and Environmental Sensors system", Journal of Southwest University of Science and Technology, vol. 31 No. 1, Mar. 2016, pp. 61-66.

* cited by examiner

POSITIONING TARGET DEVICE

RELATED APPLICATION

This application was originally filed as PCT Application No. PCT/CN2020/070157 on Jan. 2, 2020, each of which is incorporated herein by reference in its entirety.

FIELD

Embodiments of the present disclosure generally relate to communication techniques, and more particularly, to methods, devices and computer readable medium for positioning the target device.

BACKGROUND

Location information is intended as the knowledge on the position of a specific node (i.e., source localization). This information can be obtained by means of an estimation technique, commonly referred to as positioning. Positioning or locating is a very wide and important topic throughout the history. Nowadays, location-awareness has emerged as a key technology in wireless system for the future development of mobile, ad hoc and sensor networks. More and more location-based services emerged with faster and faster speed. In one word, location information will be used everywhere in daily work and live in the future. The demands for positioning are tremendous.

SUMMARY

In general, embodiments of the present disclosure relate to a method for positioning a target device and the corresponding devices.

In a first aspect, embodiments of the disclosure provide a target device. The target device comprises: at least one processor; and at least one memory including computer program codes. The at least one memory and the computer codes are configured to, with the at least one processor, cause the target device to obtain a first distance between the target device at a first location and a first anchor device at a second location and a second distance between the target device at the first location and a second anchor device at a third location. The target device is further caused to obtain a third distance between the target device at a fourth location and the first anchor device at the second location and a fourth distance between the target device at the fourth location and the second anchor device at the third location. The terminal device is also caused to determine an angle between first line connected the first and fourth locations and second line connected the second and third locations. The terminal device is yet caused to obtain a first coordinate of the first location and a second coordinate of the fourth location relative to the first and second anchor devices based at least in part on the first, second, third and fourth distances and the angle.

In a second aspect, embodiments of the present disclosure provide a method. The method comprises obtaining, at a target device, a first distance between the target device at a first location and a first anchor device at a second location and a second distance between the target device at the first location and a second anchor device at a third location. The method also comprises obtaining a third distance between the target device at a fourth location and the first anchor device at the second location and a fourth distance between the target device at the fourth location and the second anchor device at the third location. The method further comprises determining an angle associated with the first location, the second location, the third location and the fourth location. The method yet comprises obtaining a first coordinate of the first location and a second coordinate of the fourth location relative to the first and second anchor devices based at least in part on the first, second, third and fourth distances and the angle.

In a third aspect, embodiments of the disclosure provide a computer readable medium. The computer readable medium stores instructions thereon, the instructions, when executed by at least one processing unit of a machine, causing the machine to implement the method according to the second aspect of the present disclosure.

In a fourth aspect, embodiments of the disclosure provide an apparatus for communication. The apparatus comprises means for obtaining, at a target device, a first distance between the target device at a first location and a first anchor device at a second location and a second distance between the target device at the first location and a second anchor device at a third location. The apparatus also comprises means for obtaining a third distance between the target device at a fourth location and the first anchor device at the second location and a fourth distance between the target device at the fourth location and the second anchor device at the third location. The apparatus also comprises means for determining an angle associated with the first location, the second location, the third location and the fourth location. The apparatus yet comprises means for obtaining a first coordinate of the first location and a second coordinate of the fourth location relative to the first and second anchor devices based at least in part on the first, second, third and fourth distances and the angle.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Some example embodiments will now be described with reference to the accompanying drawings, where.

Throughout the figures, same or similar reference numbers indicate same or similar elements.

DETAILED DESCRIPTION

Figure 1:
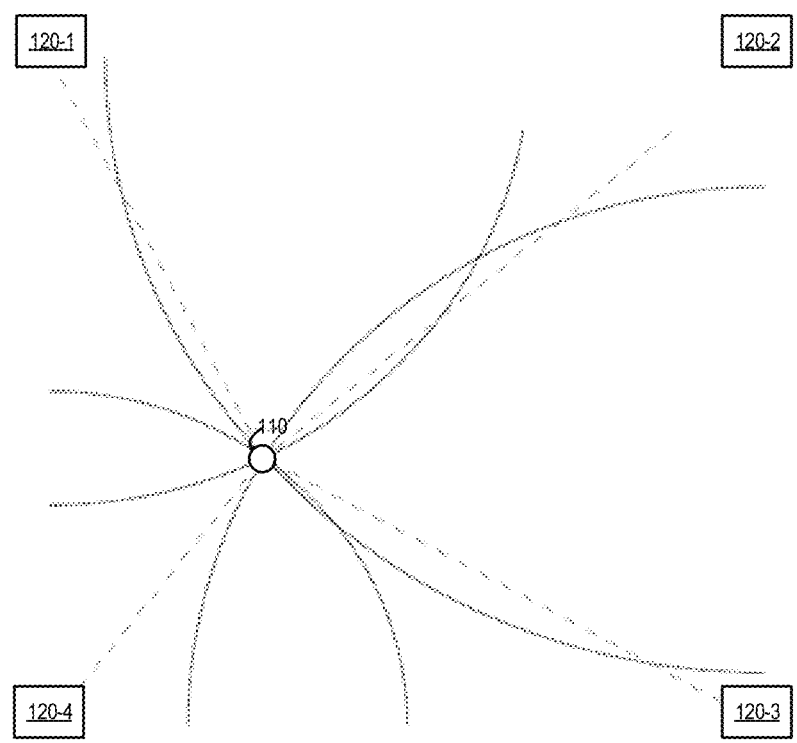
FIG. 1 illustrates a schematic diagram of a communication system according to conventional technologies.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

The term "network device" includes, but not limited to, a base station (BS), a gateway, a management entity, and other suitable device in a communication system. The term "base station" or "BS" represents a node B (NodeB or NB), an evolved NodeB (eNodeB or eNB), a Remote Radio Unit (RRU), a radio header (RH), a remote radio head (RRH), a relay, a low power node such as a femto, a pico, a relay node (for example, Unmanned Aerial Vehicle/Drones (UAV)) and so forth.

The term "terminal device" includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "circuitry" used herein may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In a localization system via wireless communications, there may be two types of devices, namely, anchors and targets. The term "anchor device" refers to a device with a fixed known location. The term "target device" refers to a device of which position is to be determined. The anchor device may be a base station in a cellular network or an access point in a local area network, or in some application scenarios, a node located via Global Positioning System (GPS). The target device may be any other device such as laptops, tablets, mobile phones, tags and the like. The objective of a positioning algorithm is to estimate unknown locations of the target devices.

Based on the type of information, different positioning techniques can be designed upon. In conventional technologies, three main categories can be identified a fingerprinting method which is based on Cannel Impulse Response, an angle-based method which is Angle of Arrival (AoA) and a distanced-based method which is based on Received Signal Strength Index (RSSI), Time-of-Arrival (ToA) and Time-Difference-of-Arrival (TDoA). Among these categories, the distance-based positioning may be the approach that has attracted the most interest because of the potential high accuracy, the applicability to different radio technologies and the ease of implementation.

In the distance-based positioning, a system where the information is a direct measure of the distance (ranging) between anchor and target devices is the simplest one. Range localization algorithms rely on the trilateration.

In a trilateration method, there need at least three anchor devices to do positioning since there are 3 variables (coordinates x, y, z) for the location of the target device. FIG. 1 illustrates a schematic diagram of a communication system according to conventional technologies. As shown in FIG. 1, in order to estimate the position of the target device 110, there may be several anchor devices to perform the positioning, for example, the anchor devices 120-1, 120-2, 120-3 and 120-4.

Though more anchor devices may help to do more accurate positioning of the target device, it may be not easy to find three or more appropriate anchor devices which have wireless communications with the target device in real world. Even using AoA to do positioning, it still needs three or more anchor devices to locate the target device in three dimension (3D) space. When angle triangulation is used (angulation), two base stations are enough. Angulation utilizes AoA measurement provided by specialized antennae installed on reference points. The AOA is the angle between the arrival signal and a fixed reference direction. Further, AOA needs the anchor device to measure the angle between the arrival signal and a fixed reference direction. It can only work well in the case that the signal measured by the anchor device is in same direction with the line of sight between the anchor device and the target device. It is very hard to be accurate and may have big error when there is multipath transmission of the signal or there is signal reflection and diffusion. Unfortunately, multipath, signal reflection and diffusion are very common in a wireless communication system.

Figure 2:
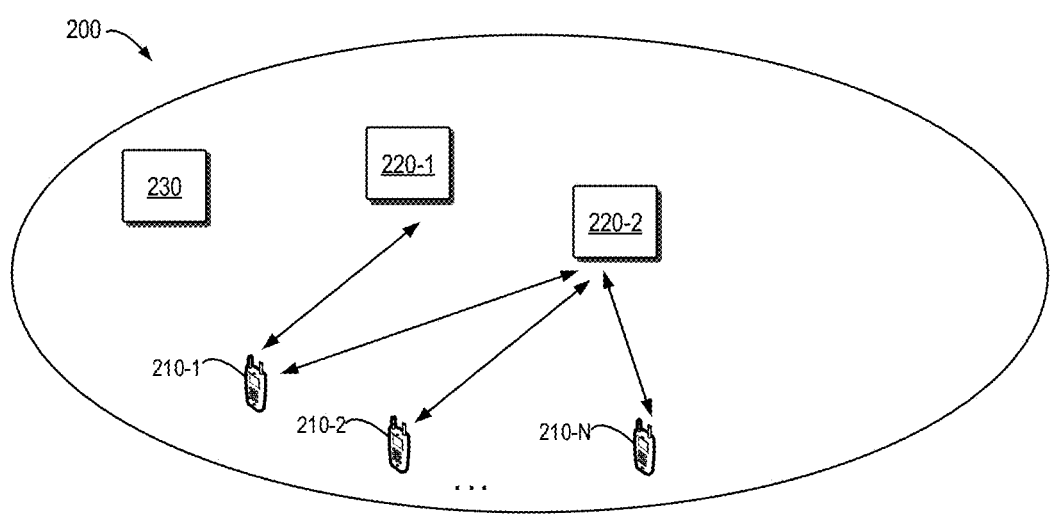
FIG. 2 illustrates a schematic diagram of a communication system according to embodiments of the present disclosure.

FIG. 2 illustrates a schematic diagram of a communication system in which embodiments of the present disclosure can be implemented. The communication system 200, which is a part of a communication network, comprises target devices 210-1, 210-2, . . . , and 210-N, which can be collectively referred to as "target device(s)" 210. The number N can be any suitable integer number. The communication system 200 further comprises anchor devices 220-1 and 220-2. It should be noted that the number of target devices and the number of anchor devices shown in FIG. 1 are given for the purpose of illustration without suggesting any limitations. The communication system 200 may comprise any suitable number of anchor devices and target devices. It should be noted that the communication system 200 may also comprise other elements, for example, the device 230, which are omitted for the purpose of clarity. The anchor devices 220 may communicate with the target devices 210.

Communications in the communication system 200 may be implemented according to any proper communication protocol(s), comprising, but not limited to, cellular communication protocols of the first generation (1G), the second generation (2G), the third generation (3G), the fourth generation (4G) and the fifth generation (5G), Wireless Fidelity (wifi), Bluetooth, ultrasound, infrared, UWB, sonar and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

According to embodiments of the present disclosure, the location of the target device is measured by two anchor devices. The distances between the target device at a location and the anchor devices are measured and the distances between the target device at a further location and the anchor devices are also measured. The location of the target device is estimated based on the distances. In this way, fewer anchor devices are used to perform the positioning.

Figure 3:
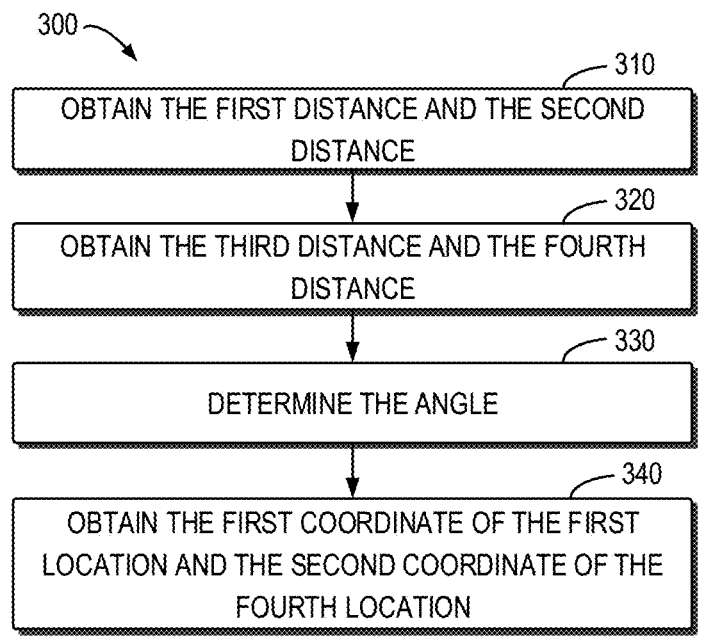
FIG. 3 illustrates a flowchart of a method implemented at a target device for communication according to embodiments of the present disclosure.
Figure 4:
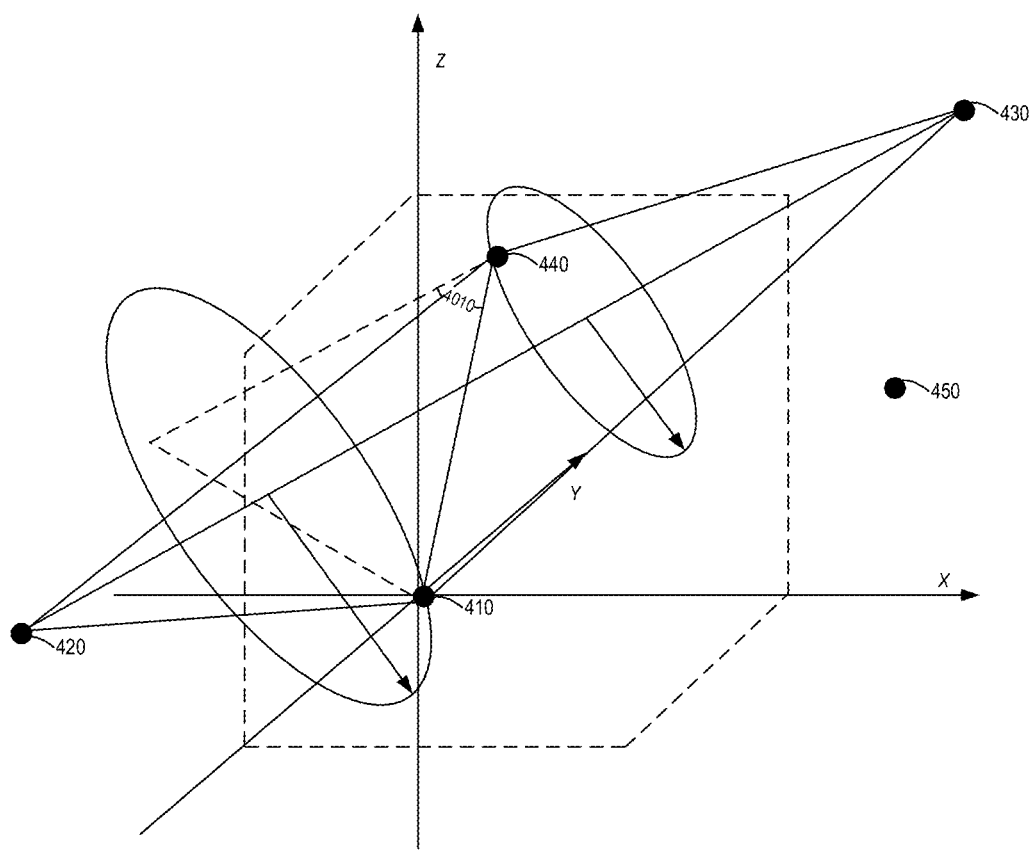
FIG. 4 illustrates a schematic diagram of a positioning method according to embodiments of the present disclosure.
Figure 5:
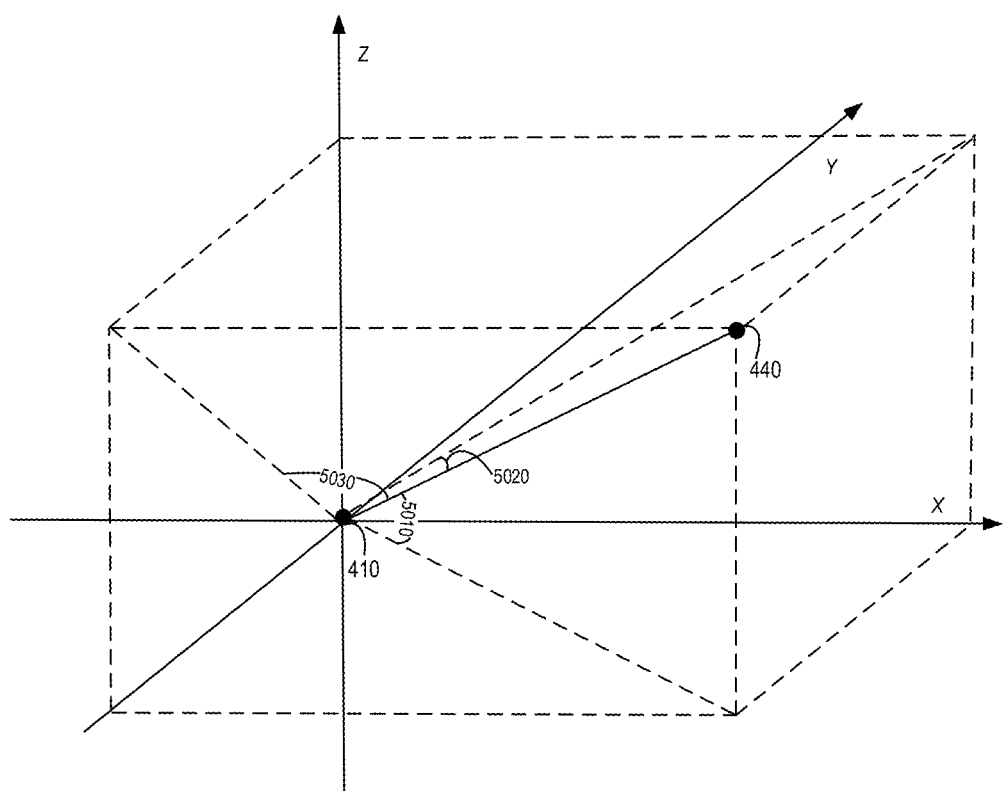
FIG. 5 illustrates a schematic diagram of a positioning method according to embodiments of the present disclosure.

FIG. 3 illustrates a flowchart of a method 300 according to embodiment of the present disclosure. Only for the purpose of illustrations, the method 300 may be described to be implemented at the target device 210-1. FIGS. 4 and 5 illustrate a schematic diagram of a positioning method according to embodiments of the present disclosure. Details of embodiments are described with the reference to FIGS. 3-5.

At block 310, the target device 210-1 obtains a first distance ($R_{AS1}$) between the target device 210-1 at the first location 410 and the first anchor device 220-1 at the second location 420. The target device 210-1 also obtains a second distance ($R_{AS2}$) between the target device 210-1 at the first location 410 and the second anchor device 220-2 at the third location 430. The second location 420 and the third location 430 are known.

In some embodiments, the first distance can be measured by the first anchor device 220-1 or the target device 210-1. The second distance may be measured by the second anchor device 220-2 or the target device 210-1. For example, the target device 210-1 may transmit a request to the first anchor device 220-1 to measure the first distance. The target device 210-1 may receive the information indicating the first distance from the first anchor device 220-1. In an example embodiment, the first and/or second distance may be measured via wireless transmission, for example, time of flight. It should be noted that the first and second distances can be measured by any suitable methods.

At block 320, the target device 210-1 obtains a third distance ($R_{BS1}$) between the target device 210-1 at the fourth location 440 and the first anchor device 220-1 at the second location 420. The target device 210-1 also obtains a fourth distance ($R_{BS2}$) between the target device 210-1 at the fourth location 440 and the second anchor device 220-2 at the third location 430.

In some embodiments, the third distance can be measured by the first anchor device 220-1 or the target device 210. The fourth device may be measured by the second anchor device 220-2 or the target device 210. In an example embodiment, the third and/or fourth distance may be measured via wireless transmission, for example, time of flight. It should be noted that the first and second distances can be measured by any suitable ways.

In some embodiments, the target device 210-1 may move to the fifth location 450. The target device 210-1 may obtain the fifth distance between the target device 210-1 at the fifth location 450 and the first anchor device 220-1 at the second location 420. The target device 210-1 may also obtain the sixth distance between the target device 210-1 at the fifth location 450 and the second anchor device 220-2 at the third location 430.

In some embodiments, the target device 210-1 may continue its movement and continue the same measure and calculation procedure. The target device 210-1 may move to any suitable number of locations to get the coordinates. For example, the target device 210-1 may obtain one or more distances between the target device 210-1 at one or more further locations and the first anchor device 220-1 at the second location 420 and one or more further distances between the target device 210-1 at the one or more further locations and the second anchor device 220-2 at the third location 430. The target device 210-1 may obtain the first coordinate, the second coordinate and one or more coordinates corresponding to the one or more locations based at least in part on the first, second, third, fourth distances, the one or more distances and the one or more further distances.

At block 330, the target device 210-1 determines the angle 4010 associated with the first location 410, the second location 420, the third location 430 and the fourth location 440. In some embodiments, the target device 210-1 may measure a plurality of angles related to the first location 410 and the third location 430 in space. The target device 210-1 may determine the plurality of angles based on its capability. For example, if the target device 210-1 may have a gyroscope, the target device 210-1 may determine the plurality of angles using the gyroscope. In other embodiments, if the target device 210-1 may have an accelerometer, the target device 210-1 may determine the plurality of angles using the accelerometer. Alternatively or in addition, if the target device 210-1 has a G-senor, the target device 210-1 may determine the plurality of angles using the G-sensor. It should be noted that the plurality of angles can be obtained using any suitable ways. In some embodiments, the target device 210-1 may transmit the information of the angle 4010 to other device, for example, the anchor devices 220-1 and 220-2 or the device 230.

As shown in FIG. 5, the target device 210-1 may determine the angles 5010, 5020 and 5030. The angle 5010 may be the angle between a line connected the first location 410 and the fourth location 440 and the plane YZ. The angle 5020 may be the angle between the line connected the first location 410 and the fourth location 440 and the plane XZ. The angle 5030 may be the angle between the line connected the first location 410 and the fourth location 440 and the plane XY.

The target device 210-1 may determine the angle 4010 based on the angles 5010, 5020 and 5030. The angle 4010 may be the angle between the line connected the first location 410 and the fourth location 440 and the line connected the second location 420 and the third location 430. In some embodiments, the angle 4010 may be obtained by:

$$\cos\alpha = \frac{\sin\gamma(x_{S1} - x_{S2}) + \sin\beta(y_{S1} - y_{S2}) + \sin\theta(z_{S1} - z_{S2})}{\sqrt{\sin\gamma^2 + \sin\theta^2 + \sin\beta^2}\sqrt{(x_{S1} - x_{S2})^2 + (y_{S1} - y_{S2})^2 + (z_{S1} - z_{S2})^2}} \quad (1)$$

wherein the parameter β represents the angle 5010, the parameter γ represents the angle 5020, the parameter θ represents the angle 5030, the parameters $x_{S1}$, $y_{S1}$ and $z_{S1}$ represent the coordinate of the second location 420, the parameters $x_{S2}$, $y_{S2}$ and $z_{S2}$ represent the coordinate of the third location 430, and the parameter α represents the angle 4010. It should be noted that the angle 4010 can be determined using any suitable ways.

At block 340, the target device 210-1 obtains a first coordinate of the first location 410 relative to the first anchor device 220-1 and the second anchor device 220-2 based on the first, second, third and fourth distances and the angle 4010. In some embodiments, the first coordinate of the first location 410 can be determined by the target device 210-1. For example, the target device 210-1 may obtain the third coordinate of the second location 420 and the fourth coordinate of the third location 430. The target device 210-1 may determine the first coordinate of the first location 410 and the second coordinate of the location 420 based on the third and fourth coordinates.

Alternatively or in addition, the first coordinate of the first location 410 may be determined by the anchor devices or other devices. For example, the target device 210-1 may transmit a request to the anchor devices for estimating the first coordinate. The target device 210-1 may receive the information indicating the first coordinate.

Only as an example, the first coordinate can be obtained as follows:

$$(x_A - x_{S1})^2 + (y_A - y_{S1})^2 + (z_A - z_{S1})^2 = R_{AS1}^2 \quad (2)$$

$$(x_A - x_{S2})^2 + (y_A - y_{S2})^2 + (z_A - z_{S2})^2 = R_{AS2}^2 \quad (3)$$

$$(x_B - x_{S1})^2 + (y_B - y_{S1})^2 + (z_B - z_{S1})^2 = R_{BS1}^2 \quad (4)$$

$$(x_B - x_{S2})^2 + (y_B - y_{S2})^2 + (z_B - z_{S2})^2 = R_{BS2}^2 \quad (5)$$

$$\sqrt{(x_A - x_B)^2} = \frac{h}{\cos\alpha}\sin\beta \quad (6)$$

$$\sqrt{(y_A - y_B)^2} = \frac{h}{\cos\alpha}\sin\gamma \quad (7)$$

$$\sqrt{(z_A - z_B)^2} = \frac{h}{\cos\alpha}\sin\theta \quad (8)$$

wherein the parameter β represents the angle 5010, the parameter γ represents the angle 5020, the parameter θ represents the angle 5030, the parameters $x_{S1}$, $y_{S1}$ and $z_{S1}$ represent the coordinate of the second location 420, the parameters $x_{S2}$, $y_{S2}$ and $z_{S2}$ represent the coordinate of the third location 430, the parameter α represents the angle 4010, the parameter $R_{AS1}$ represents the first distance between the first location 410 and the second location 420, the parameter $R_{AS2}$ represents the second distance between the first location 410 and the third location 430, the parameter $R_{BS1}$ represents the third distance between the fourth location 440 and the first location 410, the parameter $R_{BS2}$ represents the fourth distance between point the fourth location 440 and the second location 420, the parameter α represents the angle 4010, the parameters $x_A$, $y_A$ and $z_A$ represent the first coordinate of the first location 410, and the parameters $x_B$, $y_B$ and $z_B$ represent the second coordinate of the fourth location 440.

The distance between the first location 410 and the fourth location 440 may be h/cos α. Since the following parameters are known: the parameter β, the parameter γ, the parameter θ, the parameters $x_{S1}$, $y_{S1}$ and $z_{S1}$, the parameters $x_{S2}$, $y_{S2}$ and $z_{S2}$, the parameter α, the parameter $R_{AS1}$, the parameter $R_{AS2}$, the parameter $R_{BS1}$, the parameter $R_{BS2}$, the parameter α represents, the first coordinate $(x_A, y_A, z_A)$ of the first location 410 and the second coordinate $(x_B, y_B, z_B)$ of the fourth location 440 can be obtained. It should be noted that the first coordinate $(x_A, y_A, z_A)$ of the first location 410 and the second coordinate $(x_B, y_B, z_B)$ of the fourth location 440 can be obtained using any suitable methods.

In an example embodiment, as mentioned above, the target device 210-1 may move to the fifth location 450. The target device 210-1 may obtain the first coordinate, the second coordinate and a fifth coordinate of the fifth location based at least in part on the first, second, third, fourth, fifth and sixth distances. It should be noted that the target device 210-1 may move to more than three locations and obtain the coordinates of these locations.

According to embodiments of the present disclosure, the target device can be positioned with only two anchors devices in 3-D space, so the number of anchor devices has been reduced. It reduces most of difficulties to find the appropriate anchor devices for the target device or reduces the upfront investment of the anchor devices for positioning, and it also reduces the signaling, measurements for positioning. Compared with AOA positioning method, the anchor devices don't need to measure of the angle of the transmission from the target but the target device measure the angle of its own movement. This is more accurate and much easier since it doesn't depend on the wave transmission over the air which means no error caused by multipath or signal reflection.

Embodiments of the present disclosure can be applied indoors or outdoors. For example, a terminal device (i.e., the target device) can use two cells (i.e., the anchor devices) signals and its own movement to get the location, thereby improving successful rate of handover.

Figure 6:
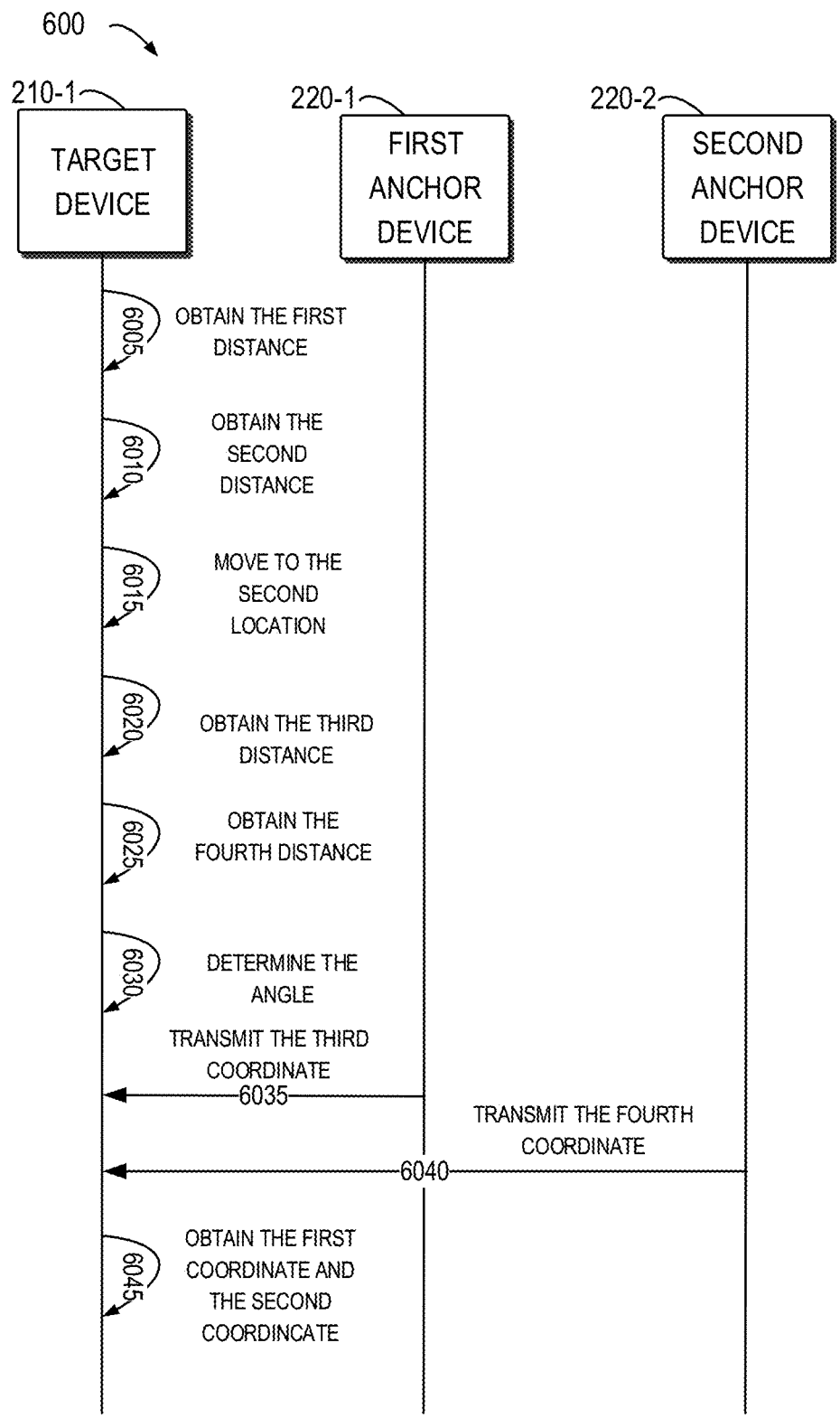
FIG. 6 is a schematic diagram illustrating interactions among devices according to an example embodiment of the present disclosure.

FIG. 6 is a schematic diagram illustrating interactions among the target device and anchor devices. Only for the purpose of illustrations 600, the interactions are described to be implemented at the target device 210-1, the anchor device 220-1 and the anchor device 220-2. It should be noted that the interactions may be implemented at any suitable devices.

The target device 210-1 at the first location 410 obtains 6005 the first distance between the target device 210-1 at the first location 410 and the first anchor device 220-1 at the second location 420. The target device 210-1 at the first location 410 obtains 6010 the second distance between the target device 210-1 at the first location 410 and the second anchor device 220-2 at the third location 430.

The target device 210-1 moves 6015 the fourth location 440. The target device 210-1 obtains 6020 the third distance between the target device 210-1 at the fourth location 440 and the first anchor device 220-1 at the second location 420. The target device 210-1 obtains 6025 the fourth distance between the target device 210-1 at the fourth location 440 and the second anchor device 220-2 at the third location 430.

The target device 210-1 determines 6030 the angle associated with the first location, the second location, the third location and the fourth location. The first anchor device 220-1 informs 6035 the third coordinate of the first anchor device 220-1 to the target device 210-1. The second anchor device 220-2 informs 6040 the fourth coordinate of the second anchor device 220-2 to the target device 210-1. The target device 210-1 obtains 6045 the first coordinate of the first location 410 and the second coordinate of the fourth location 440 relative to the first and second anchor devices 220-1 and 220-2 based at least in part on the first, second, third and fourth distances and the angle.

Figure 7:
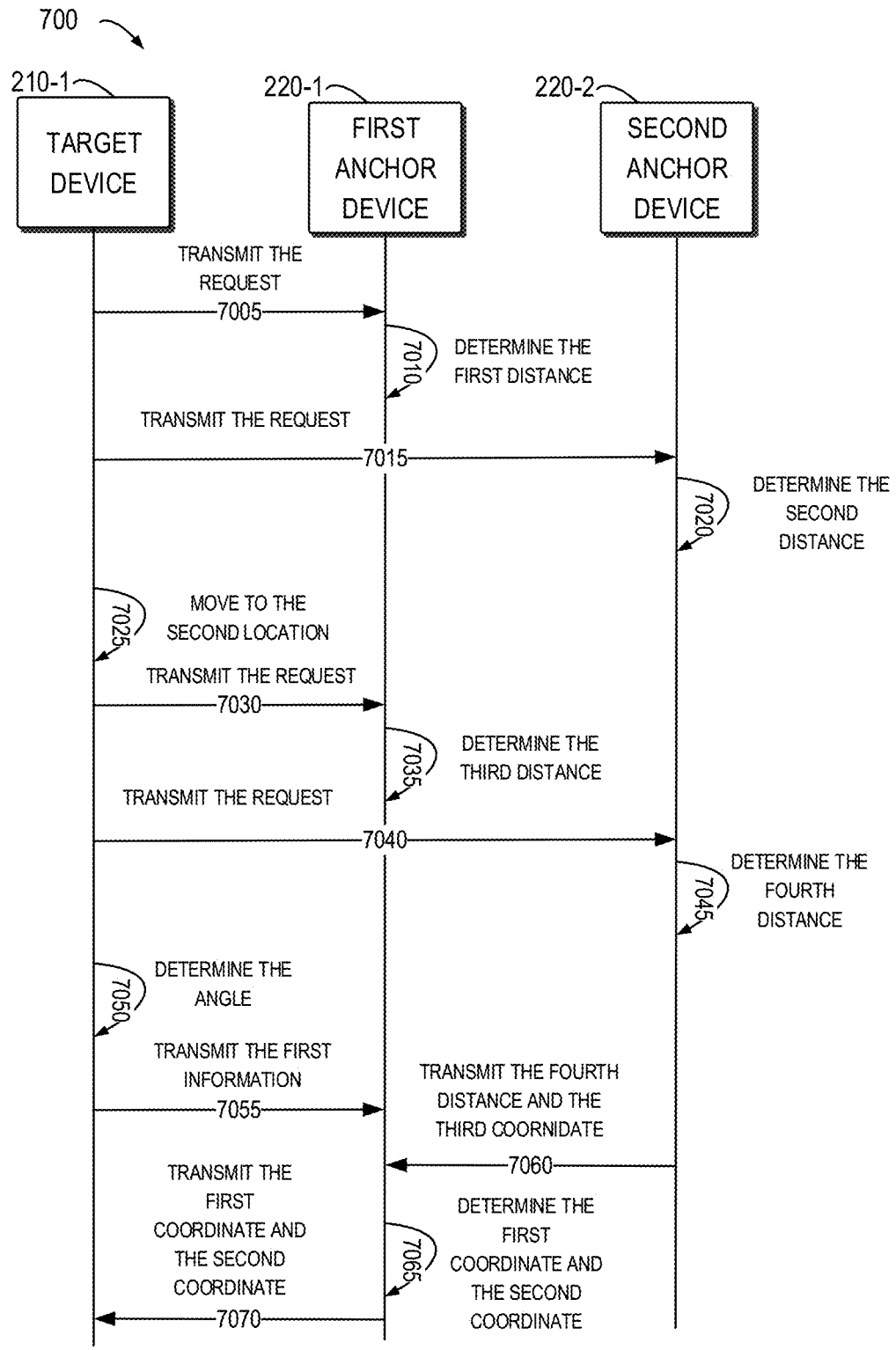
FIG. 7 is a schematic diagram illustrating interactions among devices according to an example embodiment of the present disclosure.

FIG. 7 is a schematic diagram illustrating interactions among the target device and anchor devices. Only for the purpose of illustrations, the interactions 700 are described to be implemented at the target device 210-1, the first anchor device 220-1 and the anchor second device 220-2. It should be noted that the interactions may be implemented at any suitable devices.

The target device 210-1 at the first location 410 transmits 7005 the first request to the first anchor device 220-1 to measure the first distance. The first anchor device 220-1 determines 7010 the first distance. The target device 210-1 transmits 7015 the second request to the second anchor device 220-2 to measure the second distance. The second anchor device 220-2 determines 7020 the first distance. The target device 210-1 moves 7025 to the fourth location 440.

The target device 210-1 at the fourth location 440 transmits 7030 the third request to the first anchor device 220-1 to measure the third distance. The first anchor device 220-1 determines 7035 the third distance. The target device 210-1 transmits 7040 the fourth request to the second anchor device 220-2 to measure the fourth distance. The second anchor device 220-2 determines 7045 the fourth distance.

The target device 210-1 determines 6050 the angle associated with the first location, the second location, the third location and the fourth location. The target device 210-1 transmits 7055 to the first anchor device 220-1 the first information indicating the angle and another request to estimate the first coordinate. The second anchor device 220-2 transmits 7060 information comprising the fourth distance and the fourth coordinate to the first anchor device 220-1. The first anchor device 220-1 obtains 7065 the first coordinate of the first location 410 and the second coordinate of the fourth location 440 relative to the first and second anchor devices 220-1 and 220-2 based at least in part on the first, second, third and fourth distances and the angle. The first anchor device 220-1 transmits 7065 information concerning the first coordinate of the first location 410 and the second coordinate of the fourth location 440 to the target device 210-1.

Figure 8:
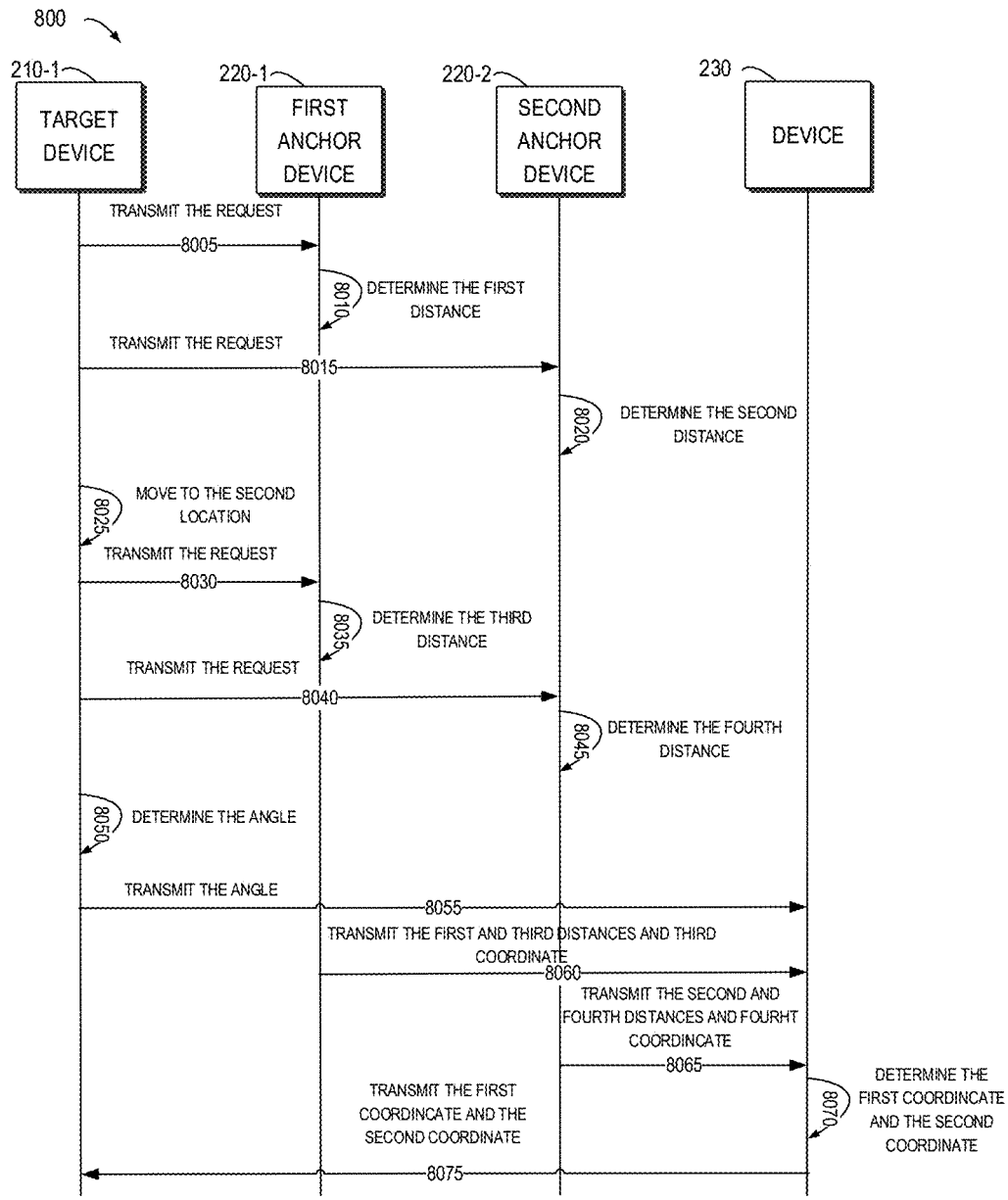
FIG. 8 is a schematic diagram illustrating interactions among devices according to an example embodiment of the present disclosure.

FIG. 8 is a schematic diagram illustrating interactions among the target device and anchor devices. Only for the purpose of illustrations, the interactions 800 are described to be implemented at the target device 210-1, the first anchor device 220-1, the second anchor device 220-2 and the device 230. It should be noted that the interactions may be implemented at any suitable devices.

The target device 210-1 at the first location 410 transmits 8005 the first request to the first anchor device 220-1 to measure the first distance. The first anchor device 220-1 determines 8010 the first distance. The target device 210-1 transmits 8015 the second request to the second anchor device 220-2 to measure the second distance. The second anchor device 220-2 determines 8020 the first distance. The target device 210-1 moves 8025 to the fourth location 440.

The target device 210-1 at the fourth location 440 transmits 8030 the third request to the first anchor device 220-1 to measure the third distance. The first anchor device 220-1 determines 8035 the third distance. The target device 210-1 transmits 8040 the fourth request to the second anchor device 220-2 to measure the fourth distance. The second anchor device 220-2 determines 8045 the fourth distance.

The target device 210-1 determines 8050 the angle associated with the first location, the second location, the third location and the fourth location. The target device 210-1 transmits 8055 to the device 230 the first information indicating the angle and another request to estimate the first coordinate. The first anchor device 220-1 transmits 8060 information comprising the first and third distances and the third coordinate to the device 230. The second anchor device 220-2 transmits 8065 information comprising the second and fourth distances and the fourth coordinate to the device 230. The device 230 obtains 8070 the first coordinate of the first location 410 and the second coordinate of the fourth location 440 relative to the first and second anchor devices 220-1 and 220-2 based at least in part on the first, second, third and fourth distances and the angle. The device 230 transmits 8075 information concerning the first coordinate of the first location 410 and the second coordinate of the fourth location 440 to the target device 210-1.

In some embodiments, an apparatus for performing the method 300 (for example, the target device 210-1) may comprise respective means for performing the corresponding steps in the method 300. These means may be implemented in any suitable manners. For example, it can be implemented by circuitry or software modules.

In some embodiments, the apparatus comprises means for obtaining, at a target device, a first distance between the target device at a first location and a first anchor device at a second location and a second distance between the target device at the first location and a second anchor device at a third location; means for obtaining a third distance between the target device at a fourth location and the first anchor device at the second location and a fourth distance between the target device at the fourth location and the second anchor device at the third location; means for determining an angle between first line connected the first and fourth locations and second line connected the second and third locations; and means for obtaining a first coordinate of the first location and a second coordinate of the fourth location relative to the first and second anchor devices based at least in part on the first, second, third and fourth distances and the angle.

In some embodiments, the means for obtaining the first distance comprises: means for transmitting a request to the first anchor device to measure the first distance; means for receiving a measurement report comprising the first distance from the second device; and means for obtaining the first distance from the measurement report.

In some embodiments, the means for obtaining the first distance comprises: means for measuring the first distance between the target device and the first anchor device.

In some embodiments, the means for determining the angle comprises: means for measuring a plurality of angles related to the first and third locations in space; and means for determining the angle based on the plurality of angles.

In some embodiments, the means for obtaining the first coordinate and the second coordinate comprises: means for transmitting first information indicating the first, second, third and fourth distances and the angle to a fourth device; and means for receiving second information indicating the first coordinate and the second coordinate from the fourth device.

In some embodiments, the means for obtaining the first coordinate and the second coordinate comprises: means for obtaining a third coordinate of the second location; means for obtaining a fourth coordinate of the third location; and means for determining the first coordinate and the second coordinate based on the second coordinate, the third coordinate, the first, second, third and fourth distances, and the angle.

In some embodiments, the means for obtaining the first coordinate and the second coordinate comprises: means for obtaining a fifth distance between the target device at a fifth location and the first anchor device at the second location and a sixth distance between the target device at the fifth location and the second anchor device at the third location; and means for obtaining the first coordinate, the second coordinate and a fifth coordinate of the fifth location based at least in part on the first, second, third, fourth, fifth and sixth distances. In some embodiments, the target device 210-1 may continue its movement and continue the same measure and calculation procedure.

In some embodiments, the target device 210-1 may continue its movement and continue the same measure and calculation procedure. The target device 210-1 may move to any suitable number of locations to get the coordinates. For example, the target device 210-1 may obtain one or more distances between the target device 210-1 at one or more further locations and the first anchor device 220-1 at the second location 420 and one or more further distances between the target device 210-1 at the one or more further locations and the second anchor device 220-2 at the third location 430. The target device 210-1 may obtain the first coordinate, the second coordinate and one or more coordinates corresponding to the one or more locations based at least in part on the first, second, third, fourth distances, the one or more distances and the one or more further distances.

Figure 9:
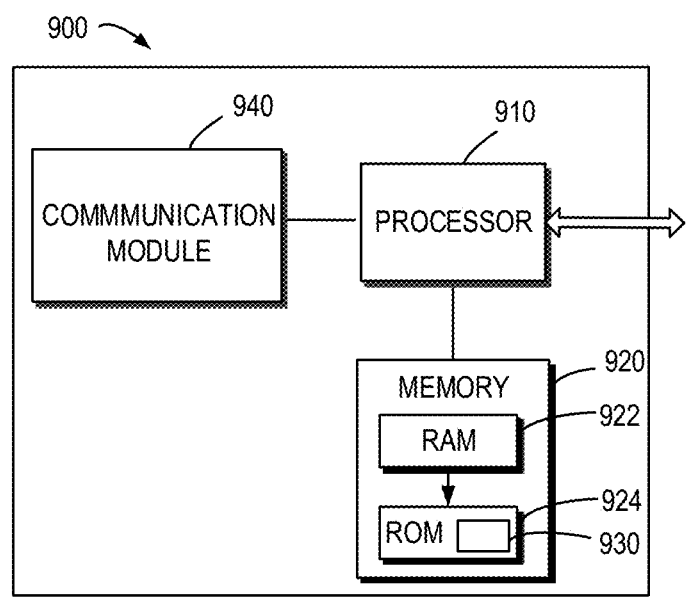
FIG. 9 illustrates a simplified block diagram of an apparatus that is suitable for implementing embodiments of the present disclosure.

FIG. 9 is a simplified block diagram of a device 900 that is suitable for implementing embodiments of the present disclosure. The device 900 may be provided to implement the communication device, for example the target devices 210 and the anchor devices 220-1 and 220-2 as shown in FIG. 2. As shown, the device 900 includes one or more processors 910, one or more memories 920 coupled to the processor 910, and one or more communication modules 940 coupled to the processor 910.

The communication module 940 is for bidirectional communications. The communication module 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 924. The processor 910 may perform any suitable actions and processing by loading the program 930 into the RAM 922.

Embodiments of the present disclosure may be implemented by means of the program 920 so that the device 900 may perform any process of the disclosure as discussed with reference to FIGS. 3 to 8. Embodiments of the present disclosure may also be implemented by hardware or by a combination of software and hardware.

Figure 10:
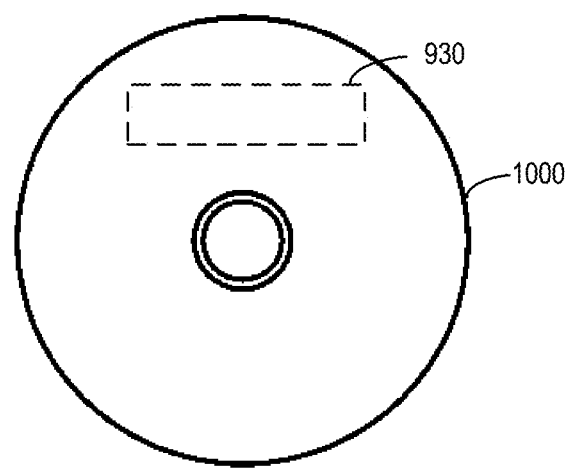
FIG. 10 illustrates a block diagram of an example computer readable medium in accordance with some example embodiments of the present disclosure.

In some example embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 in form of CD or DVD. The computer readable medium has the program 930 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labor between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the device 1000 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the device 1000 may be instead comprised in the distributed unit, and at least some of the described processes may be performed by the distributed unit.

In an embodiment, the execution of at least some of the functionalities of the device 600 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the device 1000 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 as described above with reference to FIG. 3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment.

Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A target device, comprising:
    at least one processor; and
    at least one memory including computer program codes;
    the at least one memory and the computer program codes configured to, with the at least one processor, cause the target device to:
    obtain a first distance between the target device at a first location and a first anchor device at a second location and a second distance between the target device at the first location and a second anchor device at a third location;
    obtain a third distance between the target device at a fourth location and the first anchor device at the second location and a fourth distance between the target device at the fourth location and the second anchor device at the third location;
    determine an angle between first line connecting the first and fourth locations and second line connecting the second and third locations, wherein the angle is determined based on angles between the first line and each of planes XY, YZ, and XZ, respectively; and
    obtain a first coordinate of the first location and a second coordinate of the fourth location relative to the first and second anchor devices based at least in part on the first, second, third and fourth distances and the angle.

2. The target device of claim 1, wherein the target device is caused to obtain the first distance by:
    transmitting a request to the first anchor device to measure the first distance;
    receiving a measurement report comprising the first distance from the second device; and
    obtaining the first distance from the measurement report.

3. The target device of claim 1, wherein the target device is caused to obtain the first distance by:
    measuring the first distance between the target device and the first anchor device.

4. The target device of claim 1, wherein the target device is caused to determine the angle by:
    measuring a plurality of angles related to the first and third locations in space; and
    determining the angle based on the plurality of angles.

5. The target device of claim 1, wherein the target device is caused to obtain the first coordinate and the second coordinate by:
    transmitting first information indicating the first, second, third and fourth distances and the angle to a fourth device; and
    receiving second information indicating the first coordinate and the second coordinate from the fourth device.

6. The target device of claim 1, wherein the target device is caused to obtain the first coordinate and the second coordinate by:
    obtaining a third coordinate of the second location;
    obtaining a fourth coordinate of the third location; and
    determining the first coordinate and the second coordinate based on the second coordinate, the third coordinate, the first, second, third and fourth distances, and the angle.

7. The target device of claim 1, wherein the target device is further caused to obtain the first coordinate of the first location and the second coordinate of the fourth location by:
    obtaining one or more distances between the target device at one or more further locations and the first anchor device at the second location and one or more further distances between the target device at the one or more further locations and the second anchor device at the third location; and
    obtaining the first coordinate, the second coordinate and one or more coordinates corresponding to the one or more locations based at least in part on the first, second, third, fourth distances, the one or more distances and the one or more further distances.

8. A method comprising:
    obtaining, at a target device, a first distance between the target device at a first location and a first anchor device at a second location and a second distance between the target device at the first location and a second anchor device at a third location;
    obtaining a third distance between the target device at a fourth location and the first anchor device at the second location and a fourth distance between the target device at the fourth location and the second anchor device at the third location;
    determining an angle between first line connecting the first and fourth locations and second line connecting the second and third locations, wherein the angle is determined based on angles between the first line and each of planes XY, YZ, and XZ, respectively; and
    obtaining a first coordinate of the first location and a second coordinate of the fourth location relative to the first and second anchor devices based at least in part on the first, second, third and fourth distances and the angle.

9. The method of claim 8, wherein obtaining the first distance comprises:
    transmitting a request to the first anchor device to measure the first distance;
    receiving a measurement report comprising the first distance from the second device; and
    obtaining the first distance from the measurement report.

10. The method of claim 8, wherein obtaining the first distance comprises:
    measuring the first distance between the target device and the first anchor device.

11. The method of claim 8, wherein determining the angle comprises:
    measuring a plurality of angles related to the first and third locations in space; and
    determining the angle based on the plurality of angles.

12. The method of claim 8, wherein obtaining the first coordinate and the second coordinate comprises:
    transmitting first information indicating the first, second, third and fourth distances and the angle to a fourth device; and
    receiving second information indicating the first coordinate and the second coordinate from the fourth device.

13. The method of claim 8, wherein obtaining the first coordinate and the second coordinate comprises:
    obtaining a third coordinate of the second location;
    obtaining a fourth coordinate of the third location; and determining the first coordinate and the second coordinate based on the second coordinate, the third coordinate, the first, second, third and fourth distances, and the angle.

14. The method of claim 8, wherein obtaining the first coordinate of the first location and the second coordinate of the fourth location comprises:
obtaining one or more distances between the target device at one or more further locations and the first anchor device at the second location and one or more further distances between the target device at the one or more further locations and the second anchor device at the third location; and
obtaining the first coordinate, the second coordinate and one or more coordinates corresponding to the one or more locations based at least in part on the first, second, third, fourth distances, the one or more distances and the one or more further distances.

15. A computer readable medium storing instructions thereon, the instructions, when executed by at least one processing unit of a machine, causing the machine to perform:
obtaining, at a target device, a first distance between the target device at a first location and a first anchor device at a second location and a second distance between the target device at the first location and a second anchor device at a third location;
obtaining a third distance between the target device at a fourth location and the first anchor device at the second location and a fourth distance between the target device at the fourth location and the second anchor device at the third location;
determining an angle between first line connecting the first and fourth locations and second line connecting the second and third locations, wherein the angle is determined based on angles between the first line and each of planes XY, YZ, and XZ, respectively; and
obtaining a first coordinate of the first location and a second coordinate of the fourth location relative to the first and second anchor devices based at least in part on the first, second, third and fourth distances and the angle.

16. The computer readable medium according to claim 15, wherein obtaining the first distance comprises:
transmitting a request to the first anchor device to measure the first distance;
receiving a measurement report comprising the first distance from the second device; and
obtaining the first distance from the measurement report.

17. The computer readable medium according to claim 15, wherein obtaining the first distance comprises:
measuring the first distance between the target device and the first anchor device.

18. The computer readable medium according to claim 15, wherein determining the angle comprises:
measuring a plurality of angles related to the first and third locations in space; and
determining the angle based on the plurality of angles.

19. The computer readable medium according to claim 15, wherein obtaining the first coordinate and the second coordinate comprises:
transmitting first information indicating the first, second, third and fourth distances and the angle to a fourth device; and
receiving second information indicating the first coordinate and the second coordinate from the fourth device.

20. The computer readable medium according to claim 15, wherein obtaining the first coordinate and the second coordinate comprises:
obtaining a third coordinate of the second location;
obtaining a fourth coordinate of the third location; and
determining the first coordinate and the second coordinate based on the second coordinate, the third coordinate, the first, second, third and fourth distances, and the angle.

* * * * *